April 5, 1938. J. D. LEAR 2,113,351
REFRIGERANT CONTROL DEVICE
Filed May 23, 1935
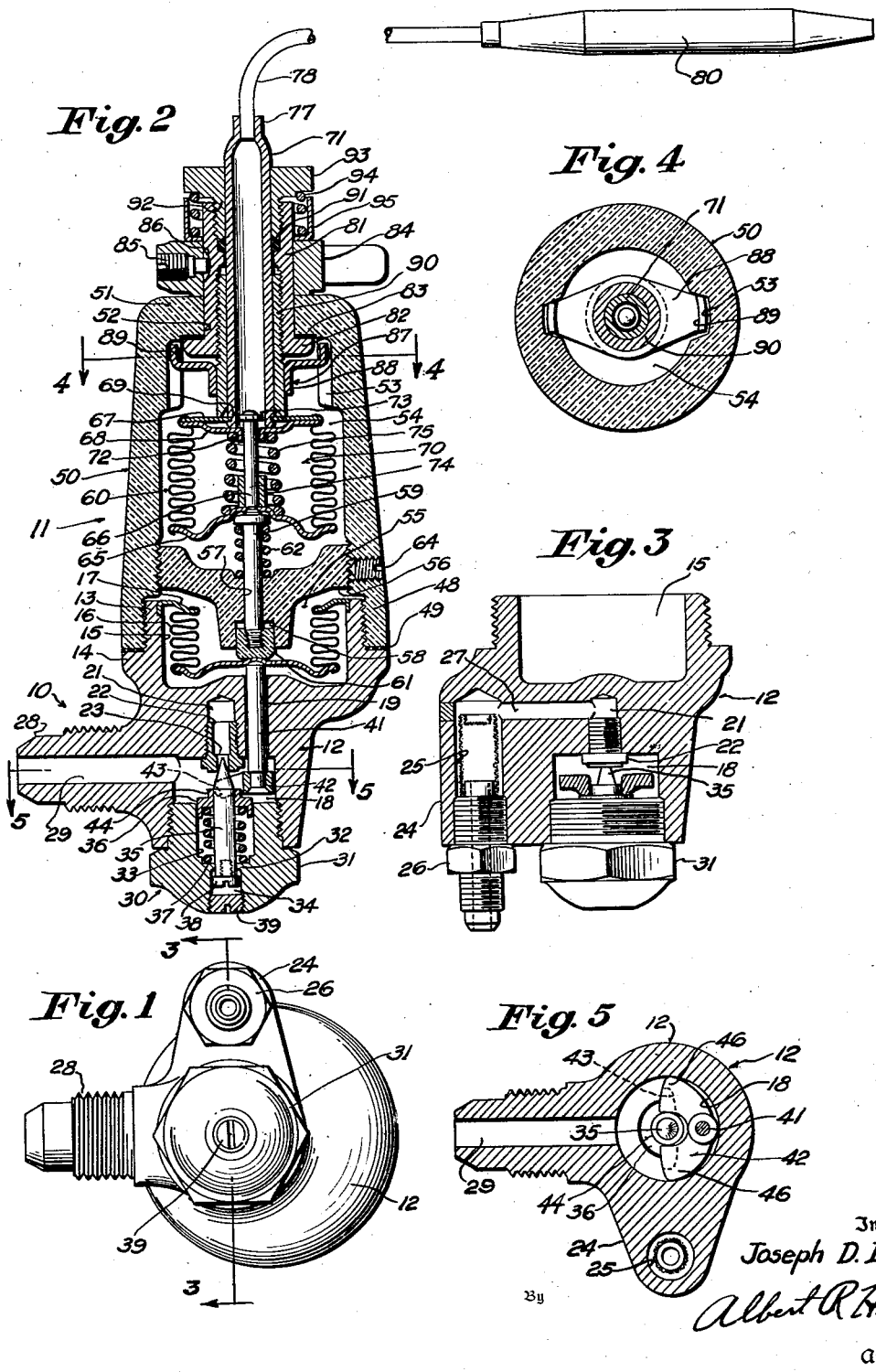
Inventor
Joseph D. Lear
By
Albert R. Henry
Attorney Patented Apr. 5, 1938

2,113,351

UNITED STATES PATENT OFFICE 2,113,351

REFRIGERANT CONTROL DEVICE

Joseph D. Lear, Buffalo, N. Y., assignor to Fedders Manufacturing Company, Inc., Buffalo, N. Y.

Application May 23, 1935, Serial No. 23,043

8 Claims. (Cl. 236—92)

This invention relates to refrigerant control devices for refrigeration systems of the direct expansion type.

The invention more particularly relates to thermostatically controlled valves wherein the thermostatic control elements are devised to provide detachable and adjustable structures with the valve portion of the device, which in itself may be utilized as an expansion valve. The improvements in the thermostatic portions of the device will be found to be directed to the isolation of the power bellows in a closed and insulated chamber to protect it from exposure to the outside air and the accompanying danger of ice accumulation. This includes the provision of a novel adjusting mechanism which is self-sealing and of a simple and inexpensive construction.

The valve elements of the invention are also arranged in a novel fashion, permitting substantially a straight line linkage between the power bellows and the needle valve, with a resulting improvement in operation and a substantial reduction in the size of the unit.

The invention will also be found to reside in the segregation of various related elements into removable and replaceable units to provide for rapid repairs or changes without a total dismantling of the entire structure. These and other features of the invention are more specifically described in the accompanying specification and drawing, wherein:

Fig. 1 is a bottom view of the valve;

Fig. 2 is a section on the line 2—2 of Fig. 1;

Fig. 3 is a section on the line 3—3 of Fig. 1 with the sealing bellows and overlying structure omitted;

Fig. 4 is a section on the line 4—4 of Fig. 2;

Fig. 5 is a section on the line 5—5 of Fig. 2.

The control device, as shown in the drawing, consists of two major units,—a valve unit 10 and a thermostatic control 11 which is removably secured thereto, so that, if desired, the valve unit may be separately utilized as an expansion valve type of control.

The valve unit 10 is provided with a body 12 which is externally flanged and threaded at its upper extremity, as indicated by the numerals 13 and 14, to provide a connection with the hereinafter described thermostatic control 11. This end of the body is also formed with an open cylindrical chamber 15, which is closed by a sealing bellows 16, the upper end 17 of which is soldered to the extremity of the body. The lower end of the body 12 is formed with a cylindrical valve chamber 18, the axis of which is disposed eccentrically relative to the axis of the chamber 15. The chambers are connected by a drilled hole 19, which is coaxial with the chamber 15. A tapped hole 21 is provided in the body at the bottom of the chamber 18, and it is coaxial with this chamber and serves to receive an externally threaded valve seat 22 containing a central orifice 23.

A vertically disposed boss 24 (Fig. 3) is provided on the body, and it is formed with an internally tapped hole 25 to receive an input fitting 26 for connection with a suitable supply or pressure conduit of a refrigeration system. A drilled hole 27 connects the holes 21 and 25, thus establishing communication between the refrigerant supply and the valve seat 22. A horizontal boss 28, also formed on the body 12, contains a drilled hole 29 entering the valve chamber 15, and it is externally threaded to receive suitable fittings of the suction line of a refrigeration system.

A needle assembly 30 (Fig. 2) is advantageously formed for unit removability from the device. It includes an externally threaded and shouldered mounting body 31 which is screwed into the chamber 18 to seal the same, and which is additionally provided with an internal needle bearing 32, on opposite sides of which are provided a bored hole 33 and a tapped counterbore 34 respectively. A pointed needle valve 35 is pressed into a cylindrical guide 36, which is slidably received in the bored hole 33. A coil spring 37 engages between the guide and the bearing 32, to force the valve upward. The lower end of the needle valve extends through the bearing 32, and it is tapped to receive a screw 38, the head of which is adapted to engage the bearing 32 to retain the needle in position against the outward urge of the spring prior to assembly with the valve unit. A plug 39 is screwed into the extremity of the counterbore 34 to seal the opening against leakage.

The needle valve 35 is connected to respond to movements of the bellows 16 by means of a coupling (Fig. 3) consisting of a pin 41 slidably received in the drilled hole 19, and a yoke 42 secured to the lower end of the pin. The yoke is formed with fingers 43 which straddle the hub 44 of the needle guide 36 and which engage on diametrically opposite sides thereof. The yoke is also formed with wings 46 which slidably engage the wall of the chamber 18 and thus retain the coupling against radial movement.

In assembling the component sub-assemblies of the valve unit 11, the seat 22 is first secured in position, followed by the insertion of the coupling 19, and the subsequent screwing of the needle valve unit 30 in position. During the latter procedure, the needle valve 35 will be brought into engagement with its seat and the stop screw 38 will be moved from the bearing 32, thus preparing the needle valve for normal operation.

As thus far described, the valve unit 11 is capable of being operated as an ordinary expansion valve, where pressure variations in the valve chamber 18 will be conveyed to the bellows through the clearance hole 19 to cause the movement of the bellows and the resulting opening or closing of the needle valve 35 through the movement imparted to the coupling by the bellows.

The thermostatic control unit for the needle valve is assembled in a housing 50, formed of an insulating material such as porcelain or a phenolic resin, and having an internally threaded open end 48 which is removably secured to the threaded portion 13 of the body 12. A gasket 49 is disposed between the housing and the body shoulder 14 to provide a leak-proof joint. The upper end of the housing is formed with a wall 51 having an axial opening 52, immediately adjacent to which are located a pair of diametrically opposed keyways 53.

The interior of the housing is divided into a power bellows chamber 54 and a sealing bellows chamber 55 by a wall member 56 formed of a material similar to the housing, and being adjustably positioned therein by a threaded connection. the wall member is formed with an axial hole 57 and a counterbore 58 respectively receiving a headed actuating pin 59 and a nut 61 therefor, which nut is formed of insulating material. A coil spring 62 is mounted between the head of the pin and the member 56.

The above described housing and wall structures adequately insulate the power bellows compartment from the colder sealing bellows compartment, and thus effect a more perfect operating environment for the power bellows 60 which is hereinafter described. It will also be noted that the nut and pin structure not only connects the bellows but serves also to retain the spring 62 in position prior to assembly with the housing.

The tension of the spring 62 may be varied by removing the housing and turning the wall member 56. A set screw 64 extending through the wall of the housing 50 is utilized to lock the wall member in a fixed position.

The power unit 70 of the thermostatic control includes the previously mentioned bellows 60 which is provided with a concave lower head 65 adapted to receive and center the head of the actuating pin 59. A stop pin 66 is riveted to the head 65 and it extends axially through the bellows. The upper head of this bellows consists of circular plates 67 and 68, the former containing a central aperture 69 in which is secured a tubular stem 71, and the latter having a central flanged hole 72 for slidably receiving the stop pin 66. A washer 73 is riveted to the protruding extremity of the pin, and it provides a stop portion in cooperation with the plate 68, to prevent destructive expansion of the bellows during shipment thereof in detached form. It will be understood that this stop structure is not always utilized subsequent to the general assembly, as the coupling and actuator pins may substitute therefor.

A length of tubing 74, disposed about the stop pin 66, provides a compression stop for the bellows, as it is engageable with the central flange of the plate 68 upon contraction of the bellows. A coil spring 75 is mounted within the bellows 60, and it tends to separate the heads.

The free extremity of the stem 71 is reduced in diameter, as indicated by the numeral 77, to receive a tube 78 which communicates with a bulb 80 containing the usual expansive fluid for operating the bellows 60. The diameter of the bulb is made equal to or less than the diameter of the stem 71, to facilitate assembly, as hereinafter described.

The housing is provided with adjusting means for the bellows 60, consisting of an internally threaded adjusting nut 81 rotatably mounted in the opening 52 of the housing and having a flange 82 for receiving a sealing washer 83 which in turn engages the housing wall 51. An operating handle 84 is secured to the protruding portion of the nut 81 by studs 85 which engage in slots 86 therein. This connection insures common rotary movement of the members and permits a small amount of relative axial movement.

An externally threaded thrust tube 90 is adjustably received within the nut 81, and it is retained against rotary movement by a key portion 87 which is secured thereto and provided with arms 88 terminating in bent fingers 89 slidably engaged in the keyways 53 of the housing.

The upper extremity of the nut 81 is internally formed to receive a packing 91 and a packing nut 92. The head 93 of the packing nut additionally serves as a spring seat for a spring 94 which is mounted in a cylindrical shield 95 in engagement with the adjusting handle 84. This spring serves to draw the nut flange 82 and internal washer 83 into sealing engagement with the housing wall 51 to prevent air leakage into the chamber 54.

With the adjusting means mounted as described, the assembly of the power unit 70 with the housing is a process simply of inserting the bulb 80 through the adjusting nut 81 and packing nut 92 followed by the positioning of the stem 71 therein, to engage the upper bellows head with the tube 90. The assembly is completed by tightening the packing nut 92 to engage the packing with the stem and accordingly to prevent air ingress into the chamber 54.

The insertion of the wall member 56 in the housing, and the subsequent application of the housing to the body 12, connects the valve for operation by the thermostatically controlled movement of the free or lower head of the power bellows 60 through the medium of the actuating pin 59, sealing bellows 16, and coupling pin 41.

To adjust the valve, the handle 84 and accompanying adjusting nut 81 are rotated, thus causing an axial movement of the adjusting tube 90, which in turn compresses or releases the bellows 60 through its engagement with the upper head thereof. This manipulation results in the compression or release of the bellows spring 75 against the load of the actuating pin spring 62 which itself is adjustable, as previously described. This provides a thermostatically operated valve with an extremely large range of adjustment from a position of substantially full compression of the spring 75, as shown in the drawing, to one where the spring 62 actually dominates.

It will be observed that the sub-assembly structure of the device provides a plurality of complete units of the important parts thereof. Thus, the needle and seat assembly may be changed for one of a larger sized orifice, or a faulty needle may be replaced by removing the needle unit 30. The wall member may likewise be adjusted or removed for the application of a spring of a different characteristic. The thermostatic power units are the most frequent cause of trouble in devices of this nature, and in the present device the inexpensive construction and simplicity of removal provides economies in both operation and replacement cost.

It will be apparent from the foregoing description that the principles of construction of the various units of the device may be varied in many respects without departing from the scope of the invention as set forth in the accompanying claims.

I claim:

1. A refrigerant control device comprising a body, a valve therein, a sealing bellows mounted in the body and operable to actuate said valve, a thermostatic bellows having a cylindrical stem sealed thereto, means connecting the bellows to each other, a housing secured to the body and enclosing the thermostatic bellows, a tubular thrust member mounted for axial movement in the housing and engaging the thermostatic bellows, said member being formed to receive said stem, and adjustment means mounted in the housing and formed to engage said thrust member, said adjusting means being operable to move the thrust member axially into engagement with the thermostatic bellows.

2. A refrigerant control device comprising a body, a valve therein, a sealing bellows mounted in the body and operable to actuate said valve, a thermostatic bellows having a cylindrical stem, means connecting the bellows to each other, a housing secured to the body and enclosing the thermostatic bellows, an internally threaded nut rotatably mounted in the housing and projecting therethrough, an externally threaded tube adjustably received within the nut, said tube having a key portion, and said housing having a guide portion for receiving the key portion for permitting axial movement of the tube, said stem being received within the tube and said thermostatic bellows being adjustably engaged by the extremity of said tube.

3. A refrigerant control device comprising a body, a valve therein, a sealing bellows mounted in the body and operable to actuate the valve, a thermostatic bellows having a cylindrical stem, means connecting the bellows to each other, a housing secured to the body and enclosing the thermostatic bellows, said housing having an end wall formed with an opening, an internally threaded nut rotatably received in the wall opening and having a flange engaging the wall on the interior of the housing, an externally threaded tube adjustably received within the nut, said tube having a key portion and said housing having a guide portion for receiving the key portion for axial guided movement of the tube, said stem extending through the tube and said thermostatic bellows being adjustably engaged by the extremity of the tube, and a packing gland mounted on the nut on the exterior of the housing and engaging the stem to prevent air ingress to the interior of the housing.

4. A refrigerant control device comprising a body, a valve therein, a sealing bellows mounted in the body and operable to actuate the valve, a thermostatic bellows having a cylindrical stem and a bulb connected to the stem, means connecting the bellows to each other, a housing secured to the body and enclosing the thermostatic bellows, said housing having an end wall formed with an opening, an internally threaded nut rotatably received in the wall opening and having a flange engaging the wall on the interior of the housing, an externally threaded tube adjustably received within the nut, said tube having a key portion and said housing having a guide portion for receiving the key portion for guided axial movement of the tube, said thermostatic bellows being adjustably engaged by the extremity of the tube and with its stem positioned within the tube, said bulb being insertible through the tube to the exterior of the housing.

5. A refrigerant control device comprising a body, a valve therein, a sealing bellows mounted in the body and operable to actuate the valve, a thermostatic bellows, means connecting the bellows to each other, a housing secured to the body and enclosing the thermostatic bellows, said housing having an end wall formed with an opening, adjustment means for the bellows including a nut rotatably received in the wall opening and having a flange engaging the wall on the interior of the housing, and resilient means on the exterior of the housing for engaging the nut and imparting an axial pull thereon to retain the flange in sealing engagement with the wall.

6. A refrigerant control device comprising a unitary valve body formed at one end with a cylindrical bellows chamber, a sealing bellows mounted in said chamber to seal said body at said end, said body being further formed with an aperture coaxial with said sealing bellows chamber, a push pin slidably mounted in said aperture, a second chamber formed in the opposite end of said valve body and axially offset with respect to said first named chamber, a valve seat disposed in said body in alignment with said second chamber, a closure member for said second chamber, a valve supported by said closure and adapted to engage said seat, means connecting said push pin and said valve whereby sliding movement of the pin effects the actuation of the valve, said body being formed with laterally disposed inlet and outlet ports on opposite sides of said valve seat, said push pin being located within the area of said second chamber whereby removal of said closure member permits removal of the pin, valve, and connecting means.

7. A fluid control device comprising a valve body, a valve therein, inlet and outlet passages associated therewith, a housing secured to said body, a first bellows associated with said housing arranged to be actuated by a thermally responsive device, a second bellows associated with said body to seal said body from the surrounding ambient, means associated with the thermostatic bellows for deforming said sealing bellows, passage means leading from the fluid inlet to the second bellows whereby its deformation may be affected, valve actuating means arranged in alignment with said first mentioned means, said valve being offset from said last mentioned means.

8. The structure recited in claim 7, wherein said valve actuating means is located, at least in part, within said passage means.

JOSEPH D. LEAR.

DISCLAIMER 2,113,351.—*Joseph D. Lear*, Buffalo, N. Y. REFRIGERANT CONTROL DEVICE. Patent dated April 5, 1938. Disclaimer filed September 5, 1939, by the assignee, *Fedders Manufacturing Company, Inc.*

Hereby enters this disclaimer to claims 7 and 8 in said specification.

[*Official Gazette October 3, 1939.*]